United States Patent [19]

Milner

[11] Patent Number: 5,268,408
[45] Date of Patent: Dec. 7, 1993

[54] PROCESS FOR THE PREPARATION OF COLLOIDAL MANGANESE DIOXIDE

[75] Inventor: Clifford E. Milner, Rochester, N.Y.

[73] Assignee: E. I. DuPont de Nemours and Company, Wilmington, Del.

[21] Appl. No.: 672,873

[22] Filed: Mar. 20, 1991

[51] Int. Cl.$^5$ ............................................... C08K 3/20
[52] U.S. Cl. ....................................... 524/413; 524/430
[58] Field of Search .................................. 524/430, 413

[56] References Cited

U.S. PATENT DOCUMENTS

| | | | |
|---|---|---|---|
| 3,567,452 | 3/1971 | Rawlins, Jr. | 430/539 |
| 3,630,739 | 12/1971 | Hine | 430/510 |
| 3,755,186 | 8/1973 | Hine | 252/300 |
| 3,773,539 | 11/1973 | Sato et al. | 117/33.3 |
| 3,869,402 | 3/1975 | Mackey et al. | 96/84 |
| 3,984,247 | 10/1976 | Nakamura et al. | 430/522 |

FOREIGN PATENT DOCUMENTS

| | | |
|---|---|---|
| 0106448 | 4/1984 | European Pat. Off. |
| 0260577 | 3/1988 | European Pat. Off. |
| 575512 | 2/1946 | United Kingdom |
| 985276 | 3/1965 | United Kingdom |
| 2005697 | 4/1979 | United Kingdom |

OTHER PUBLICATIONS

World Patents Index, Week 7448, Derwent Publications, Ltd., London, GB, AN 74-83710V and JP-B-49 040 865 (Japanese Geon Co. Ltd.) Jun. 11, 1974 (abstract).

*Primary Examiner*—Paul R. Michl
*Assistant Examiner*—John J. Guarriello

[57] ABSTRACT

This invention relates to the preparation of antihalation layers for photographic film. The invention is an improved process for the preparation of colloidal manganese dioxide dispersions adapted for use in antihalation layers, the process comprising adding a reducing agent to an aqueous solution comprising a water soluble permanganate salt and a dispersing agent, the improvement wherein said dispersing agent is a water soluble polymer selected from the group consisting of water soluble carboxylated acrylic polymers, water soluble styrene/acrylic copolymers, and water soluble alpha-methyl styrene/acrylic copolymers.

11 Claims, No Drawings

PROCESS FOR THE PREPARATION OF COLLOIDAL MANGANESE DIOXIDE

FIELD OF THE INVENTION

This invention relates to the preparation of antihalation layers for photographic film. More particularly this invention relates to a process for the preparation of colloidal manganese dioxide adapted for use in antihalation layers.

BACKGROUND OF THE INVENTION

Scattered and reflected incident radiation can expose a radiation sensitive layer in regions in which exposure is not desired. The use of antihalation layers to prevent this unwanted exposure is well known. Typically these auxiliary layers contain a dye or a pigment which absorbs the incident radiation. An antihalation layer may be either a backing layer, positioned on the side of the support opposite that bearing the radiation sensitive layer or layers, or an undercoat layer, located between the support and the radiation sensitive layer or layers.

Although dyes are used in antihalation layers, they frequently cause undesirable residual stain on the processed film. The use of manganese dioxide in antihalation layers is well known. The material possesses desirable absorption characteristics for use in antihalation layers and is cleared in the developing process.

Manganese dioxide containing antihalation layers have been prepared by a number of different processes. Gelatin, alcohols, and polyvinyl alcohol have each been used to reduce potassium permanganate to manganese dioxide. Mackey, U.S. Pat. No. 3,869,401, discloses the preparation of manganese dioxide by reduction of potassium permanganate with polyols. Sato, U.S. Pat. No. 3,773,539, discloses the reduction of potassium permanganate with a chemically modified gelatin obtained by reacting the gelatin with a compound capable of reacting with the amino group of the gelatin, such as sulfonyl chlorides, carboxylic acid chlorides, acid anhydrides, etc. Hine, U.S. Pat. No. 3,630,739, discloses preparation of manganese dioxide by addition of potassium permanganate to an aqueous solution of a hydrolyzed maleic anhydride copolymer, such as a methyl vinyl ether/maleic anhydride copolymer, an ethylene/maleic anhydride copolymer, etc. In this process the polymer hydrolyzate serves as the reducing agent or an auxiliary reducing agent may be added to assist in the reduction of the permanganate salt.

Each of these processes has certain disadvantages. Some are extremely difficult to run on a commercial scale and/or can produce unstable colloids which aggregate producing materials which are unsuitable for use in antihalation layer. Use of gelatin as the dispersing agent causes degradation of the gelatin due to attack of the permanganate on the gelatin. Aldehydes can not be used as reducing agents with gelatin since they would crosslink the gelatin. Other dispersing agents can produce unstable colloids which are not suitable for use in antihalation layers.

To be useful in an antihalation layer, the pigment must be colloidal in size for optical efficiency and must not form aggregates during the preparation process. In addition, the process must not cause degradation of the properties of the layer, especially if the layer is a backing layer containing matte particles so that it can be used for drafting and other applications in which it is desired to write on the backing layer. Current manganese dioxide containing backing layer suffer from this disadvantage, causing pen clogging, pencil gouging, etc.

SUMMARY OF THE INVENTION

In accordance with this invention there is provided a process for the preparation of colloidal manganese dioxide dispersions adapted for use in antihalation layers, the process comprising adding a reducing agent to an aqueous solution comprising a water soluble permanganate salt and a dispersing agent, the improvement wherein said dispersing agent is a water soluble polymer selected from the group consisting of water soluble carboxylated acrylic polymers, water soluble styrene/acrylic copolymers, and water soluble alpha-methyl styrene/acrylic copolymers.

DETAILED DESCRIPTION OF THE INVENTION

Manganse Dioxide Dispersion

Colloidal manganese dioxide dispersions may be prepared by the reduction of an aqueous solution of a water soluble permanganate salt with a reducing agent in the presence of a dispersing agent. Outstanding dispersing agents are water soluble carboxylated acrylic polymers, water soluble styrene/acrylic copolymers, and water soluble alpha-methyl styrene/acrylic copolymers. The resultant colloidal dispersion is compatible with gelatin so that a smooth antihalation layer can be formed on the film base by conventional procedures.

Carboxylated acrylic polymers are polymers which comprise acrylic acid and/or methacrylic acid copolymerized with other monomers, especially other acrylic monomers, such as, for example, methyl acrylate, methyl methacrylate, and ethyl acrylate. Styrene/acrylic copolymers are copolymers which comprise acrylic acid and/or methacrylic acid copolymerized with styrene. alpha-Methyl styrene/acrylic copolymers are copolymers which comprise acrylic acid and/or methacrylic acid copolymerized with alpha-methyl styrene. The copolymer must comprise a sufficient level of copolymerized acrylic acid and/or methacrylic acid that it is water soluble. The dispersing agent must be sufficiently water soluble that a stable dispersion of manganese dioxide can be prepared.

The general method for preparing manganese oxide dispersions is to add a reducing agent to a stirred aqueous solution of a water soluble permanganate salt and the water soluble dispersing agent. The reducing agent is normally added as an aqueous solution. Addition as an aqueous suspension may be used if the reducing agent is not soluble in water. Although it is generally more convenient to add the reducing agent to the solution of permanganate salt and dispersing agent, addition of a solution of the permanganate salt to an aqueous solution or suspension of reducing agent and dispersing agent may also be carried out. Stirring should be adequate to provide good mixing.

The temperature of addition is not extremely critical. Addition is conveniently carried out at about room temperature, although higher temperatures may be used, if desired. It is not necessary to closely control the temperature of the dispersion during addition of the reducing agent. If desired, the dispersion may be neutralized following addition of the reducing agent. In general, however, it is not necessary to neutralize the dispersion following addition of the reducing agent.

The concentration of dispersing agent is not extremely critical. Good results have been obtained with concentrations in the range of about 4% to about 9% by weight dispersing agent. A convenient concentration is about 6% to 7% by weight dispersing agent. A convenient concentration for the permanganate salt is about 0.2 mol/L to about 0.3 mol/L. The preferred water soluble permanganate salt is potassium permanganate (KMnO$_4$).

Reducing agents which can be used in the practice of this invention include alcohols, such as, for example, methanol and ethanol, and aldehydes, such as for example, formaldehyde, glyoxal, butyraldehyde, and salicylaldehyde. Other reducing agents which may be used to advantage can be determined by reference to redox potentials and routine experimentation. As will be apparent to those skilled in the art, sufficient reducing agent should be added to convert all the permanganate to manganese dioxide.

Aldehydes are a preferred class of reducing agents. Since aldehydes crosslink gelatin, they can not normally be used as the reducing agent in prior art processes in which gelatin is the dispersing agent. More preferred reducing agents are formaldehyde and glyoxal. The most preferred reducing agent is formaldehyde.

Antihalation Layers

Antihalation layers for photosensitive elements may be prepared from the manganese dioxide dispersions by, for example, combining the dispersion with a film-forming binder to provide a coating liquid, and coating the coating liquid onto an appropriate photographic support. Such binders are well-know in the art and include hydrophilic colloids, such as, for example, gelatin, which may be derived from various sources, such as, for example, cattle bone, pigskin, etc.; gelatin derivatives, such as, for example, phthalated gelatin, acetylated gelatin, etc.; polysaccharides, such as, for example, dextran, etc.; synthetic polymers, such as, for example, poly(vinyl alcohol) and water soluble partially hydrolyzed poly(vinyl acetate); acrylamide polymers; polymers of alkyl and sulfoalkyl acrylates and methacrylates; polyamines; poly(vinyl acetals), such as, for example, polyvinyl acetal, etc.; poly(vinyl ethers); etc. Gelatin is preferred as a film-forming binder.

Wetting agents and hardeners, such as are well known in the art, may be added to the antihalation layer. If the antihalation layer is a backing layer for a film, such as a drafting film, that will be drawn or written upon in normal usage, matte may also be added as known to one skilled in the art. For antihalation layers, an optical density of about 0.15 to about 0.35 in the wavelength range used for imaging is desirable.

Photosensitive Layer/Film Support

The photosensitive element comprises a photosensitive layer and a support. The element may also comprise any of a number of the other layers which are conventional in photosensitive elements.

The preparation of silver halide emulsions is well known in the art. Silver halide emulsions, their preparation, and the preparation of photosensitive layers therefrom, are described in, for example: Research Disclosure, Item 17643, December, 1978; Research Disclosure, Item 18431, August, 1979; Research Disclosure, Item 22534, January, 1983; and Abbott, U.S. No. Pat. 4,425,426.

The photosensitive layer is preferably a standard, gelatino silver halide emulsion layer which is applied on one side of the element. Conventional photographic silver halide emulsions employing any of the commonly known halides, such as silver chlorine, silver bromide, silver iodide, and mixtures thereof, may be used. These may be of varied content and may be negative and/or positive working.

The photosensitive layer also comprises a binder. Such binders are well-known in the art and include the materials useful as binders for the antihalation layer, described above. A preferred binder is gelatin.

The photosensitive layer may be hardened by addition of a conventional hardening agent, such as, for example, an aldehyde, such as formaldehyde or glyoxal. Conventional additives may also be present for specific purposes, such as, for example, to aid coating, to enhance and/or stabilize the response of the emulsion, etc.

The support can be any of a number of supports for photosensitive elements known in the art. These include polymeric films such as, for example: cellulose esters, such as, for example, cellulose triacetate, etc.; polyesters of dibasic aromatic carboxylic acids and divalent alcohols, such as, for example, poly(ethylene terephthalate), poly(ethylene isophthalate), etc., paper; polymer coated paper; copolymerized vinyl compounds, such as, for example, vinyl acetate/vinyl chloride copolymer; polystyrene; polyacrylates; etc. Dyes may be incorporated into the support to impart a color thereto.

Preferred supports include polyesters made according to Alles, U.S. Pat. No. 2,779,684, the pertinent disclosure of which is incorporated herein by reference. These supports are particularly suitable because of their dimensional stability. Photographic grade polyethylene terephthalate film, made according to the well-known teachings of the art, is the most preferred film support. The film is cast and then stretched in both dimensions and heat relaxed to attain dimensional stability. A standard resin sub layer is applied on at least one side of the film support to form a thin, anchoring substratum over which a gelatin sublayer may be applied. Typical resin subbing layers include copolymers of vinylidene chloride, such as are disclosed, for example, by Rawlins, U.S. Pat. No. 3,567,452, and Alles, U.S. Pat. No. 2,627,088. The pertinent disclosures of these patents are incorporated herein by reference.

The element may comprise any of a number of the other conventional additives and layers, such as those disclosed in any of the references cited above. These include, for example, optical brighteners, antifoggants, emulsion stabilizers, image stabilizers, filter dyes, intergrain absorbers, light-scattering materials, gelatin hardeners, coating aids, surfactants, overcoat layers, interlayer and barrier layers, antistat layers, plasticizers and lubricants, matting agents, development inhibitor-releasing compounds, etc. The element can be prepared by coating the layers onto the support using coating techniques which are conventional in the art.

Industrial Applicability

Colloidal manganese dioxide dispersions, prepared by the improved processes of this invention, can be used in antihalation layers for photosensitive elements. These dispersions are particularly useful in the production of matte containing backing layers. These photosensitive elements are especially useful for drafting applications.

The advantageous properties of this invention can be observed by reference to the following examples which illustrate, but do not limit, the invention. The percentages in the examples are by weight.

EXAMPLES

| GLOSSARY | |
|---|---|
| Glascol RP2 | Carboxylated acrylic polymer; Tg 58° C.; 30% solids in water ammonia; pH 7.5; Allied Colloids, Suffolk, VA |
| Joncryl ® 61 | Styrene/acrylic copolymer, 34% solids; S. C. Johnson and Son, Racine, WI |
| Joncryl ® 62 | Acrylic acid/alpha-methyl styrene copolymer, 30% solids; CAS 26745-16-4; S. C. Johnson and Son, Racine, WI |
| Lucidene ® 432 | Acrylic emulsion; Morton Thiokol, Chicago, IL |
| Morcryl TM 134 | Styrene/acrylic copolymer; Morton Thiokol, Chicago, IL |
| Nacrylic ® 78-6178 | Carboxylated acrylic polymer; National Starch and Chemical, Bridgewater, NJ |
| PFAZ ® 322 | 1,1,1-Trimethylolpropane tris(2-methyl-1-aziridine propionate; CAS 64265-57-2; Sybron Chemical, Birmingham, NJ |
| TiPure ® LW | Titanium dioxide nitrile white pigment; E. I. du Pont de Nemours and Company, Wilmington, DE |
| Syloid ® 72 | Silica matte; Davidson Chemical Company, Cincinnati, OH |
| Polystep ® B-27 | 14.9% aqueous solution of sodium lauryl ether sulfate; Stephan Chemical Company, Northfield, IL |
| Product BCO | Wetting agent; CAS 69898-09-5; E. I. du Pont de Nemours and Company, Wilmington, DE |

EXAMPLE 1

This examples demonstrates the preparation of a manganese dioxide dispersion using a carboxylated acrylic polymer dispersing agent.

Step 1. A solution containing 6.42% of carboxylated acrylic polymer in water was prepared by adding 102.5 g of Glascol RP2 (30.75 g of polymer) to 376 g of water. Formaldehyde (22 mL of 6.67 M formaldehyde solution diluted to 50 mL with water) was added. Aqueous potassium permanganate (273 ml of a 0.27 M solution) was pumped in at room temperature at a rate of 26 mL/minute. The solution was stirred during addition. Following addition the temperature of the resulting $MnO_2$ dispersion was 33° C. and the pH was about 6.8.

Step 2. Water (160 mL) was added to 200 mL of the manganese dioxide dispersion prepared. Dry gelatin (23 g of Kind and Knox gel blend 693) was added. After 15 minutes of stirring at room temperature, the dispersion was heated about 125° F. (about 52° C.) for 15 minutes to dissolve the gelatin. After the gelatin had dissolved, heating was discontinued and the following was added: 3 mL of a dispersion containing 0.6 g of TiPure ® LW and 0.03 mL of a 10% sodium hexametaphosphate solution; 29 g of a dispersion containing 16.8% Syloid ® 72 and 5% Product BCO; 9 mL of a solution containing 15% Polystep ® B27; and 2 mL of Teflon ® 30 fluoropolymer resin dispersion.

Step 3. To 100 mL of this dispersion was added 0.75 mL of 0.066 M chromium potassium sulfate solution followed by 1.5 mL of 1.33 M formaldehyde. The dispersion was coated with a Consler #20 rod onto a conventional resin subbed polyethylene terephthalate photographic support.

The optical density of the resulting coated support was measured by a MacBeth TD927 optical transmission densitometer with "white light", "blue light", "green light", and "red light" filters using air as a reference. For comparison, a support containing a conventional manganese dioxide layer made by precipitation in gelatin was also measured. The results are given in Table 1.

TABLE 1

| | Optical Density | |
|---|---|---|
| | Glascol RP2 | Gelatin[a] |
| White light | 0.35 | 0.31 |
| Blue light | 0.47 | 0.43 |
| Green light | 0.29 | 0.26 |
| Red light | 0.21 | 0.19 |

[a]Control

EXAMPLE 2

This example illustrates the preparation of a manganese dioxide dispersion using different concentrations of carboxylated acrylic polymer dispersing agent.

The procedure of Example 1 was repeated except that the dispersing agent was Nacrylic ® 78-6178. Three concentrations of dispersing agent were used: 4.24%, 6.42%; and 8.54%. The results are given in Table 2.

TABLE 2

| | Optical Density | | |
|---|---|---|---|
| | 4.24%[a] | 6.42% | 8.54% |
| White light | 0.24 | 0.24 | 0.24 |
| Blue light | 0.33 | 0.33 | 0.35 |
| Green light | 0.19 | 0.19 | 0.20 |
| Red light | 0.14 | 0.13 | 0.14 |

[a]Percentage of Nacrylic ® 78-6178 dispersing agent present during preparation of the $MnO_2$ dispersion.

EXAMPLE 3

This example illustrates the preparation of a manganese dioxide dispersion using a different order of reagent addition.

Step 1 of Example 1 was repeated except that (1) Nacrylic ® 78-6178 (6.42%) was used as the dispersing agent and (2) the permanganate solution was added before the formaldehyde solution. A stable dispersion with no aggregates was formed. An aliquot (0.5 mL) was diluted to 200 mL and the absorption spectrum of the resulting dispersion determined. The dispersion had an optical density of 2.37 at 300 nm; 1.90 at 350 nm; and 1.26 at 400 nm. A dispersion prepared by the same procedure except that the formaldehyde was added first has an optical density of 2.57 at 300 nm; 2.15 at 350 nm; and 1.26 at 400 nm.

EXAMPLE 4

This example illustrates the preparation of a manganese dioxide dispersion with different dispersing agents and at an elevated temperature.

The procedure of Example 1 was repeated except that (1) Morcryl TM 134 (6.42%) and Joncryl ® 61 (6.42%) were each used as the dispersing agent and (2) addition of the formaldehyde was carried out at 48° C. The optical densities of the resulting coated supports are given in Table 3.

TABLE 3

| | Optical Density | |
|---|---|---|
| | Morcryl TM 134 | Joncryl ® 61 |
| White light | 0.31 | 0.22 |

TABLE 3-continued

|  | Optical Density | |
|---|---|---|
|  | Morcryl ™ 134 | Joncryl ® 61 |
| Blue light | 0.45 | 0.39 |
| Green light | 0.25 | 0.16 |
| Red light | 0.17 | 0.09 |

EXAMPLE 5

This example illustrates the preparation of a manganese dioxide dispersion using an alcohol as the reducing agent.

The procedure of Step 1 of Example 1 was repeated except that (1) Nacrylic ® 78-6178 (6.42%) was used as the dispersing agent and (2) ethanol (16.6 g diluted to 50 mL with water) was added at 46° C. A stable dispersion with no aggregates was formed. An aliquot (0.5 mL) was diluted to 200 mL and the absorption spectrum of the resulting dispersion determined. The dispersion had an optical density of 1.02 at 300 nm and 0.94 at 400 nm.

EXAMPLE 6

This example illustrates the preparation of a manganese dioxide dispersion using salicylaldehyde as the reducing agent.

The procedure of Step 1 of Example 1 was repeated except that (1) Nacrylic ® 78-6178 (6.42%) was used as the dispersing agent and (2) salicylaldehyde (18 g shaken with 32 mL of water) was added at room temperature. A stable dispersion with no aggregates was formed.

EXAMPLE 7

This example illustrates the preparation of manganese dioxide dispersions using glyoxal as the reducing agent and using (1) a carboxylated acrylic polymer and (2) a styrene/acrylic copolymer as dispersing agents.

The procedure of Example 1 was repeated except that (1) Nacrylic ™ 78-0178 (6.42%) and Morcryl ™ 134 (6.42%) were each used as the dispersing agent and (2) glyoxal (4 mL diluted to 50 mL with water) was added at room temperature. The optical densities of the resulting coated supports are given in Table 4.

TABLE 4

|  | Optical Density | |
|---|---|---|
|  | Nacrylic ® 78-0178 | Morcryl ™ 134 |
| White light | 0.14 | 0.25 |
| Blue light | 0.14 | 0.34 |
| Green light | 0.12 | 0.21 |
| Red light | 0.11 | 0.15 |

EXAMPLE 8

This example illustrates the preparation of manganese dioxide dispersions using (1) a carboxylated acrylic polymer and (2) an alpha-methyl styrene/acrylic copolymer as dispersing agents.

The procedure of Example 1 was repeated except that (1) Joncryl ® 62 (6.42%) and Nacrylic ® 78-6178 (6.42%) were each used as the dispersing agent; (2) the formaldehyde was added at 47° C.; and the dispersion was coated with a Consler #10 rod. The optical densities of the resulting coated supports are given in Table 5.

TABLE 5

|  | Optical Density | |
|---|---|---|
|  | Nacrylic ® 78-6178 | Joncryl ® 62 |
| White light | 0.19 | 0.22 |
| Blue light | 0.28 | 0.36 |
| Green light | 0.13 | 0.16 |
| Red light | 0.08 | 0.09 |

COMPARATIVE EXAMPLE

The procedure of Example 1 was repeated except that (1) Lucidene ® 432 (6.42%) was used as the dispersing agent and the formaldehyde was added at 47° C. A stable dispersion was not formed. The manganese dioxide aggregated before addition of the formaldehyde was complete.

What is claimed is:

1. In a process for the preparation of colloidal manganese dioxide dispersions adapted for use in antihalation layers, the process comprising adding a reducing agent to an aqueous solution comprising a water soluble permanganate salt and a dispersing agent, the improvement wherein said dispersing agent is a water soluble polymer selected from the group consisting of water soluble carboxylated acrylic polymers, water soluble styrene/acrylic copolymers, and water soluble alpha-methyl styrene/acrylic copolymers.

2. The process of claim 1 wherein said reducing agent is an aldehyde.

3. The process of claim 1 wherein said reducing agent is selected from the group consisting of formaldehyde and glyoxal.

4. The process of claim 1 wherein said water soluble permanganate salt is potassium permanganate.

5. The process of claim 1 wherein said dispersing agent is a water soluble carboxylated acrylic polymer.

6. The process of claim 5 wherein said reducing agent is an aldehyde.

7. The process of claim 5 wherein said reducing agent is selected from the group consisting of formaldehyde and glyoxal.

8. The process of claim 1 wherein said dispersing agent is a water soluble water soluble styrene/acrylic copolymer or water soluble alpha-methyl styrene/acrylic copolymer.

9. The process of claim 8 wherein said reducing agent is an aldehyde.

10. The process of claim 8 wherein said reducing agent is selected from the group consisting of formaldehyde and glyoxal.

11. The process of claim 8 wherein said water soluble permanganate salt is potassium permanganate.

* * * * *